(12) United States Patent
Dixon et al.

(10) Patent No.: US 12,516,968 B2
(45) Date of Patent: Jan. 6, 2026

(54) ULTRASONIC FLOW MEASUREMENT

(71) Applicant: The University of Warwick, Coventry (GB)

(72) Inventors: Steven Dixon, Coventry (GB); Zhichao Li, Coventry (GB)

(73) Assignee: The University of Warwick, Coventry (GB)

( * ) Notice: Subject to any disclaimer, the term of this patent is extended or adjusted under 35 U.S.C. 154(b) by 290 days.

(21) Appl. No.: 17/926,184

(22) PCT Filed: May 14, 2021

(86) PCT No.: PCT/GB2021/051167
§ 371 (c)(1),
(2) Date: Nov. 18, 2022

(87) PCT Pub. No.: WO2021/234350
PCT Pub. Date: Nov. 25, 2021

(65) Prior Publication Data
US 2023/0243682 A1 Aug. 3, 2023

(30) Foreign Application Priority Data
May 18, 2020 (GB) ...................................... 2007303

(51) Int. Cl.
*G01F 1/667* (2022.01)
(52) U.S. Cl.
CPC .................................. *G01F 1/667* (2013.01)
(58) Field of Classification Search
CPC ............. G01F 1/667; G01F 25/10; G01F 1/66
See application file for complete search history.

(56) References Cited

U.S. PATENT DOCUMENTS

| 5,117,698 A | 6/1992 | Baumoel |
| 2011/0271769 A1 | 11/2011 | Kippersund et al. |
| (Continued) | | |

FOREIGN PATENT DOCUMENTS

| DE | 19653001 A1 | 6/1998 |
| DE | 102009048646 A1 | 3/2011 |
| (Continued) | | |

OTHER PUBLICATIONS

International Search Report and Written Opinion issued Jul. 19, 2021 in corresponding International Application No. PCT/GB2021/051167.

(Continued)

*Primary Examiner* — Tarun Sinha
(74) *Attorney, Agent, or Firm* — NovoTechIP International PLLC

(57) ABSTRACT

A method of determining flowrate of a fluid (7) in a pipe is disclosed. The flowrate is determined using a flowmeter having first and second ultrasonic transducers (10; FIG. 8A) separated along the pipe by a given distance (D; FIG. 1) and inclined so that waves in the fluid propagate at a given path angle (θ; FIG. 1). For a given inner pipe diameter (d; FIG. 1), there is a given integer number of reflections between the first and second ultrasonic transducers. The method comprises obtaining flow rate measurements using wave packets (18) corresponding to an integer number of reflections which is less than said given number.

16 Claims, 15 Drawing Sheets

(56) References Cited

U.S. PATENT DOCUMENTS

| | | | |
|---|---|---|---|
| 2014/0366642 A1* | 12/2014 | Tanaka | G01F 1/668 73/861.27 |
| 2017/0038234 A1 | 2/2017 | Lötters et al. | |
| 2017/0082650 A1* | 3/2017 | Hies | G01P 5/245 |
| 2017/0167904 A1* | 6/2017 | Sathyanarayana | G01F 1/66 |
| 2019/0033265 A1 | 1/2019 | Rautenberg | |

FOREIGN PATENT DOCUMENTS

| | | |
|---|---|---|
| EP | 1627366 A1 | 2/2006 |
| EP | 3175205 A1 | 6/2017 |
| EP | 3495783 A1 | 6/2019 |
| JP | 2008107288 A | 5/2008 |
| WO | 2004102499 A1 | 11/2004 |
| WO | 2016016818 A1 | 2/2016 |

OTHER PUBLICATIONS

Great Britain Intellectual Property Office Combined Search and Examination Report issued Oct. 6, 2020 in corresponding Great Britain Application No. 2007303.7.

Aanes et al., "Time-of-flight dependency on transducer separation distance in a reflective-path guided-wave ultrasonic flow meter at zero flow conditions", Journal of the Acoustical Society of America, vol. 142, Iss. 2, 2017, p. 825-837, https://doi.org/10.1121/1.4996851.

* cited by examiner

ULTRASONIC FLOW MEASUREMENT

FIELD

The present invention relates to ultrasonic flow measurement.

BACKGROUND

Ultrasonic, clamp-on metering is used extensively for measuring flow of liquids and sometimes gases in pipes.

Two transducers are clamped to the outside of a pipe in which liquid is flowing. One transducer generates an ultrasonic wave that enters through the pipe wall into the liquid, then travels through the liquid. The wave can then couple through the pipe wall and be detected by a second transducer or can bounce within the liquid column several times before being detected by a second transducer that can be on the same side or on the opposite side of the pipe as the first sensor. The process is then reversed using the second transducer to generate an ultrasonic wave that travels along the same path in reverse and is detected by the first transducer. The difference in the transit time for these two wave packets can be related to the rate of liquid flow down the pipe.

Usually, alignment of the transducers is very important since incorrect positioning can mean that the ultrasonic wave is not incident at an ideal position on the transducer doing the detection. Existing systems require some initial setting-up in which the user inputs pipe size, thickness and material to find the required separation of the transducers. Once in the approximate position, the system often also provides a signal strength indicator to help with accurate alignment and to ensure good ultrasonic coupling of the transducers to the pipe and fluid.

It is known that ultrasonic waves can propagate in a pipe wall and to take advantage of wave propagation through the pipe wall in flow metrology, for example, as described in EP 0 264 991 A1, US 2011/271769 A1 and M. Aanes et al., "Time-of-flight dependency on transducer separation distance in a reflective-path guided-wave ultrasonic flow meter at zero flow conditions", J. Acoust. Soc. Am., vol. 142, pp. 825 to 837 (2017).

Further advantage of propagation through the pipe wall can, however, be taken.

SUMMARY

According to a first aspect of the present invention there is provided a method of determining flowrate of a fluid in a pipe. The flowrate is determined using a flowmeter having first and second ultrasonic transducers separated along the pipe by a given distance and inclined so that waves in the fluid propagate at a given path angle. For a given pipe diameter, there is a given integer number of reflections (from the inside of the pipe) between the first and second ultrasonic transducers. The method comprises obtaining a flow rate using measurements using wave packets corresponding to an integer number of reflections which is less than said given number.

Since waves propagate along a path which includes the pipe wall, the ultrasonic transducers do not need to be accurately positioned at particular locations along the pipe so as to determine flowrate of a fluid in the pipe.

The transducers do not need to lie exactly at (or over) a point of reflection, i.e., at a point corresponding to R (and so that the given integer number is R). Thus, where a transducer lies between points where there are R and (R+2) reflections, then the given integer number is R.

According to a second aspect of the present invention there is provided a method of determining flowrate of a fluid in a pipe. The flowrate is determined using a flowmeter having first and second ultrasonic transducers separated along the pipe by a given distance and inclined so that waves in the fluid propagate at a given path angle. For a given pipe diameter, there is a given integer or half-integer number of 'V'-shaped path sections between the first and second ultrasonic transducers (for example, in cases where the transducers are mounted on the same side of the pipe or on opposite sides of the pipe, respectively). The method comprises obtaining a flow rate using measurements using wave packets corresponding to an integer number or half-integer number of 'V'-shaped path sections which is less than said given number.

The fluid may be a liquid. The liquid may be water.

The path angle may between 20° and 45°. The given number of V-shaped path sections may be between 1.5 and 10. Preferably, the given number of 'V'-shaped path sections is between 3 and 8. Preferably, the first and second ultrasonic transducers are mounted on the same side of the pipe.

Obtaining the flow rate may comprise taking time-of-flight measurements between the first and second ultrasonic transducers.

The time-of-flight measurement may comprise measuring a first time-of-flight of a first wave packet travelling from the first ultrasonic transducer to the second ultrasonic transducer, measuring a second time-of-flight of a second wave packet travelling from the second ultrasonic transducer to the first ultrasonic transducer and calculating a value of difference between the first and second time-of-flights. Determining flowrate comprises calculating the flowrate in dependence upon the difference.

Obtaining the flow rate may comprise taking a phase difference measurement between first and second pulses transmitted simultaneously by the first and second ultrasonic transducers, respectively and received by the second and first ultrasonic transducers, respectively.

Thus, a phase difference measurement between two, almost time-coincident pulses can be used to calculate flowrates. The arrival times of the first and second pulses differ due to transit time difference caused by fluid flowing through the pipe.

The method may comprise setting a time window so as to select the wave packets corresponding to the integer number of reflections.

The method may comprise selecting the wave packets corresponding to the integer number which exceeds a given threshold value of signal-to-noise or which has the largest value of signal-to-noise.

In some embodiments, only a signal received in the time window is passed on to be processed. This can help to reduce time for analogue-to-digital conversion and/or data processing time. In other embodiments, a signal received in a wider time window may be passed on to be processed, but only the signal in the time window is processed.

The method may comprise obtaining a flow rate using at least two, different wave packets in the same received signal corresponding to respective integer numbers of reflections.

By using at least two, different wave packets (for example, a first corresponding to, say, one 'V'-shaped path sections in the fluid and a second corresponding to, say, two 'V'-shaped path sections), can help to calculate the flow rate more precisely.

The method may comprise exciting the first and second ultrasonic transducers simultaneously, isolating the first and second transducers from each other and sending first and second signals received by the first and second transducers, respectively, to a circuit for measuring a difference in first and second transit times for the first and second signals, respectively. This can help increase precision and reproducibility.

The method may comprise adjusting separation of the first and second ultrasonic transducers or prompting a user to adjust separation of the first and second ultrasonic transducers. Adjusting the separation of the first and second ultrasonic transducers can be used to increase signal-to-noise ratio.

According to a third aspect of the present invention there is provided a computer program comprising instruction which, when executed by a data processor, causes the data processor to perform the method of the first or second aspect of the invention.

According to a fourth aspect of the present invention there is provided a computer program product comprising a computer-readable medium (which may be non-transitory) storing therein the computer program of the third aspect of the present invention.

According to a fifth aspect of the present invention there is provided a signal processor configured to determine flowrate of a fluid in a pipe using first and second ultrasonic transducers separated by a given distance along the pipe and inclined so that waves in the fluid propagate at a given path angle, wherein, for a given pipe diameter, there is a given integer number of reflections between the first and second ultrasonic transducers, the signal processor configured to obtain a flow rate using wave packets corresponding to an integer number of reflections which is less than said given number.

According to a sixth aspect of the present invention there is provided a ultrasonic flowmeter comprising first and second ultrasonic transducers and instrumentation configured to determine flowrate of a fluid in a pipe using the first and second ultrasonic transducers to be separated by a given distance along the pipe and inclined so that waves in the fluid propagate at a given path angle, wherein, for a given pipe diameter, there is a given integer number of reflections between the first and second ultrasonic transducers, the signal processor configured to obtain a flow rate using wave packets corresponding to an integer number of reflections which is less than said given number.

According to a seventh aspect of the present invention there is provided a system comprising a pipe and the ultrasonic flowmeter of the sixth aspect, wherein the first and second ultrasonic transducers are mounted to the pipe separated by a given distance along the pipe and inclined so that waves in the fluid propagate at a given path angle.

The pipe may be formed from a metal. For example, the pipe may be copper tubing used in domestic plumbing.

For example, the pipe may be 15 mm or 22 mm copper pipe having an outer diameter of 15 mm and 22 mm, respectively and wall thicknesses of 0.7 and 0.9 mm, respectively so as to have an inner diameter of 13.6 and 20.2 mm respectively. Other sizes of pipes can be used having outer diameters of 28 mm, 35 mm, 42 mm, 54 mm, 66.7 mm, 76.1 mm, and 108 mm.

For example, the pipe may have a Copper Tubing Size (CTS) nominal size of ¼ or ⅜ corresponding to outer diameter of 9.5 mm and 12.7 mm, respectively. For ¼ nominal size, the inner diameter may be 7.75 mm (Type K) or 8.00 mm (Type L). For ⅜ nominal size, the inner diameter may be 10.21 mm (Type K), 10.92 mm (Type L) or 11.43 (Type M). Other CTS sizes of pipes can be used, for example, having nominal size of ½, ⅝, ¾ 1, 1¼, 1½, 2, 2½ and 3 having respective outer diameters and inner diameters depending on type (i.e. K, L, M).

The pipe may be formed from another different material, such as a metal, for instance, steel or stainless steel.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
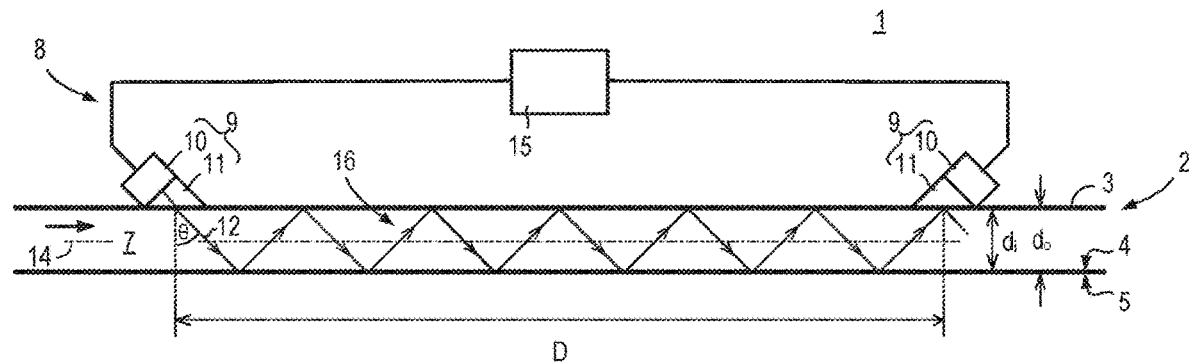
FIG. 1 is a schematic view of a pipe and two clamp-on ultrasonic transducers attached to the pipe at different positions along the pipe and a path comprising multiple V-path sections between the ultrasonic transducers.

Referring to FIG. 1, a clamp-on ultrasonic flowmeter arrangement 1 is shown.

The arrangement 1 includes a pipe 2 which comprises a pipe wall 3 having inner and outer wall surfaces 4, 5 and which defines a passage through which a fluid 7 can flow, and a clamp-on ultrasonic flowmeter 8 comprising first and second transducer units 9. The pipe 2 has an inner pipe diameter $d_i$ and an outer pipe diameter $d_o$.

Each transducer unit 9 comprises a transducer 10, for example in the form of piezoelectric transducer, and a suitably-shaped transmission element 11 (or "wedge") for directing ultrasonic pressure waves 12 between the transducer to and pipe wall 3 at an acute angle with respect to the pipe 2.

The transducer units 9 are removably attached to the outer surface 5 of the pipe 2 using a clamp, clip, band or other form of fastener (not shown). The transducers units 9 lie on the same side of the pipe 2 along a line 13 running parallel to the longitudinal axis 14 of the pipe 2 and are separated by a distance D along the pipe 2 (in other words, where the difference between their circumferential angles of position is 0°). The transducer units 9 are arranged opposite each other such that the inclined transducers to generally face each other. As will be explained in more detail hereinafter, the transducers units 9 may lie on the opposite sides of the pipe 2 (where the difference is 180°) or even at other different angles (where the difference is neither 0° or 180°).

Instrumentation 15 is used to drive the transducers to in turn, to receive and process signals from the transducers to and to calculate a flow rate based on time and/or phase.

Exciting one of the two transducers 10 with an electrical pulse generates an ultrasonic pressure wave 12 which enters the fluid 7 in the pipe 2. The pressure wave 12 propagates through the fluid 7 down the pipe 2 along a path 16 in which it is reflected multiple times by the inner surface 4 of the pipe wall 3 and is detected by the other of the two transducers 10.

First, one transducer 10 ("first transducer") is excited and the travelled pressure wave 12 is measured at the other transducer 10 ("second transducer"). The process is repeated, but in reverse, with the other transducer 10 (i.e., the second transducer) being excited and the travelled pressure wave 12 measured at the transducer 10 (i.e., the first transducer). Two measurements are taken in which the waves 12 travel in opposite directions. Thus, if fluid 7 is flowing through the pipe 2, then one measurement involves a wave travelling downstream (with respect to flow), and the other wave travelling upstream. By subtracting time-of-flight of the waves propagating upstream and downstream, the instrumentation 15 can calculate the flowrate of the fluid.

Although determining flowrate using the clamp-on ultrasonic flowmeter arrangement 1 is simple in principle, it is generally considered to more difficult to achieve in practice.

Even though the transducer units 9 may be exactly aligned on the circumference of the pipe 2 so as to lie on the same line 13 and be precisely separated so that the wave 12 is detected a point of maximum amplitude (in other words, in which the path consists of a whole-odd number of reflections), the measured signal can be difficult to identify and measure easily.

First, the wave propagation is considered to be complex so that the receiver ultrasonic transducer may receive the wave 12 which has travelled along different paths having different times of flights.

Figure 2:
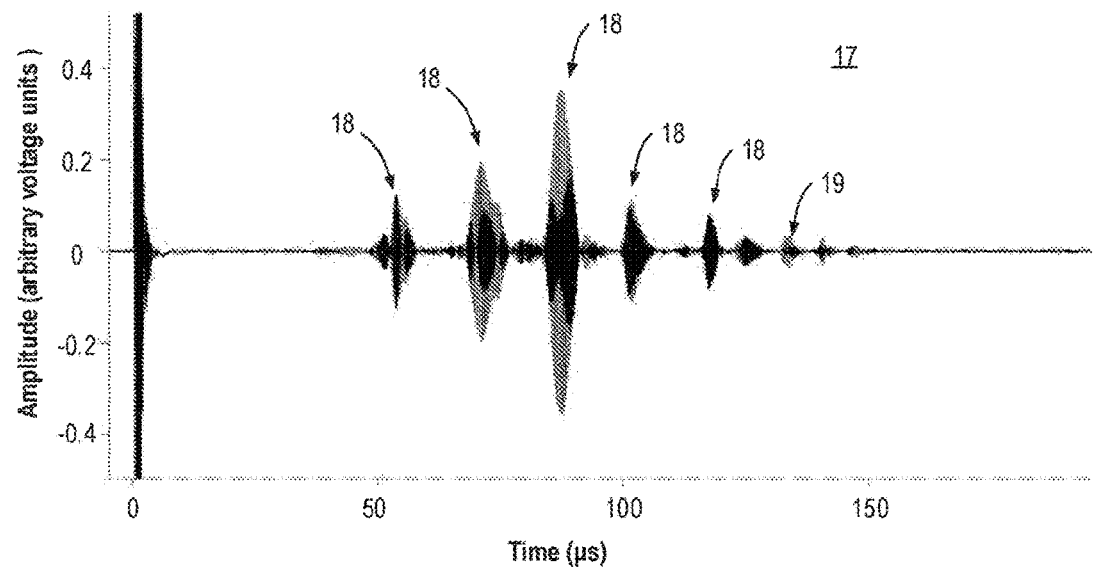
FIG. 2 is a plot of signal amplitude against time at a receiver ultrasonic transducer for the arrangement shown in FIG. 1.

Referring also to FIG. 2, a plot 17 of signal amplitude against time measured at a receiver ultrasonic transducer 10 is shown. The plot 17 shows multiple wave packets 18 spaced in time and having different amplitudes. The expected wave packet 19 corresponding to the position of the receiver 10 is inconspicuous.

Secondly, precise separation of transducers 10 is considered to be difficult to achieve since the point of maximum amplitude can move up or down the pipe depending on temperature.

Figure 3:
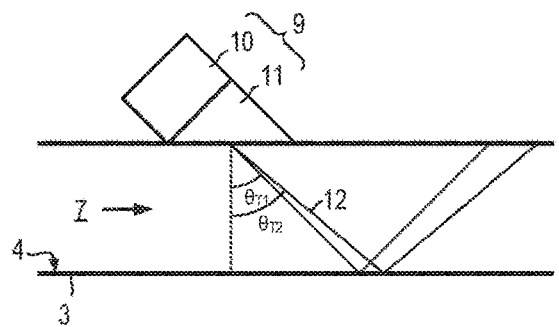
FIG. 3 illustrates the effect of temperature on ultrasonic wave path angle.

Referring to FIG. 3, a transducer unit 9 which is generating a pressure pulse 12 is shown. The path angle θ of the pressure wave 12 in the fluid 7 varies with temperature. Thus, the ultrasonic wave 12 may have a first path angle $\theta_{T1}$ at a first temperature T1 and a second, different path angle $\theta_{T1}$ at a second, different temperature T2. This affects the position at which the wave 12 hits the inner surface of the pipe. Thus, even though a transducer 10 may be positioned at a point of maximum amplitude at one temperature, it will not be positioned at a point of maximum amplitude at other temperatures.

The invention is based on a combination of observations and insights.

One observation is that when an ultrasonic wave is generated, it enters and propagates through not only the fluid, but also the pipe wall as a guided wave.

Another observation is that the fact that the ultrasonic wave can propagate through the pipe wall can relax the requirements for positioning transducers circumferentially and longitudinally along the pipe since the ultrasonic waves need not follow one precise path.

Yet another observation is that pressure waves in the fluid will mode convert to guided waves in the pipe wall when the pressure waves hit the pipe wall and also the guided waves in the pipe wall continuously radiate energy into the liquid as pressure waves. The fact that the ultrasonic wave can propagate along the pipe wall can relax the requirements for positioning transducers circumferentially and longitudinally along the pipe since the ultrasonic waves need not follow a specific or precise path.

One insight is that, in a time-of-flight measurement using the type of transducer arrangement shown in FIG. 1, amplitude peaks in the type of plot shown in FIG. 2 can be attributed to wave propagation involving paths which involve specific numbers of V-shaped path sections. Thus, even though a transducer arrangement is set up with a particular path in mind, a measurement can obtain information about other paths.

Another insight is that, in similar types of measurements, amplitude peaks not attributed to a specific path would hitherto be ignored or dismissed, for example, as noise or artefacts.

Taken these observations and insights into consideration, the inventors have had the insight that one transducer arrangement can be used a clamp-on flow meter for a variety of pipes having different pipe wall thicknesses, pipe wall diameters and pipe wall materials, and at different temperatures. In other words, careful positioning of the transducers is not required. Instead, for a given transducer arrangement, any amplitude peak can be chosen (preferably the largest one) and a flow rate determined provided the number of V'-shaped path sections is known or can be found.

Thus, careful positioning of transducers in a clamp-on flow meter is not required and even means that a universal flow meter with a single or limited number or range of transducers separation can be used in certain applications, such as domestic water pipes.

To help explain this insight, possible transmission paths between transducer units 9 will be described.

FIGS. 4, 5, 6A to 6D and 7A to 7F illustrate, highly schematically, components of (or contributions to) ultrasonic wave propagation along a pipe 2 and fluid 7 between transducer units 9.

Figure 4:
FIG. 4 is a schematic view of the pipe and clamp-on ultrasonic transducers shown in FIG. 1 illustrating ultrasonic wave propagation between the ultrasonic transducers solely by a guided wave propagating through the wall of the pipe.

Referring to FIG. 4, a wave can propagate between the transducer units 9 solely through the pipe wall 3, without entering the fluid 7, as a propagating guided wave 20.

Figure 5:
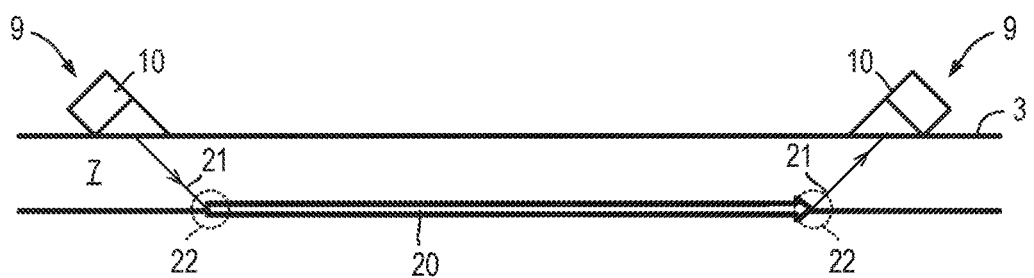
FIG. 5 is a schematic view of the pipe and clamp-on ultrasonic transducers shown in FIG. 1 illustrating ultrasonic wave propagation between the ultrasonic transducers by propagation through a fluid, mode conversion, propagation through the pipe and mode conversion.
Figure 6:
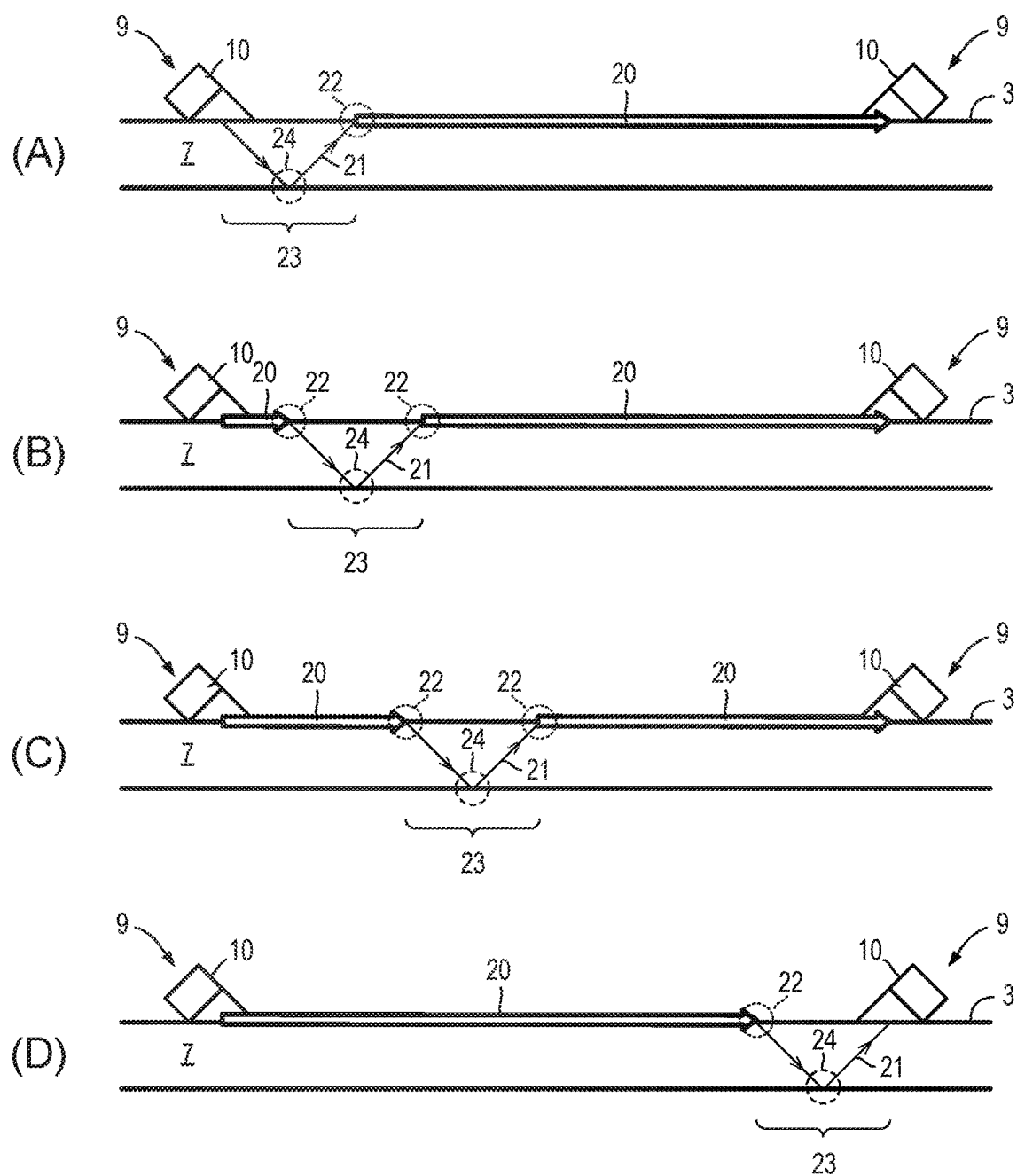
FIGS. 6A to 6D are schematic views of the pipe and clamp-on ultrasonic transducers shown in FIG. 1 illustrating ultrasonic wave propagation between the ultrasonic transducers via paths involving a single reflection and propagation in the pipe as guided wave(s) and which produce the same received wave packet.
Figure 7:
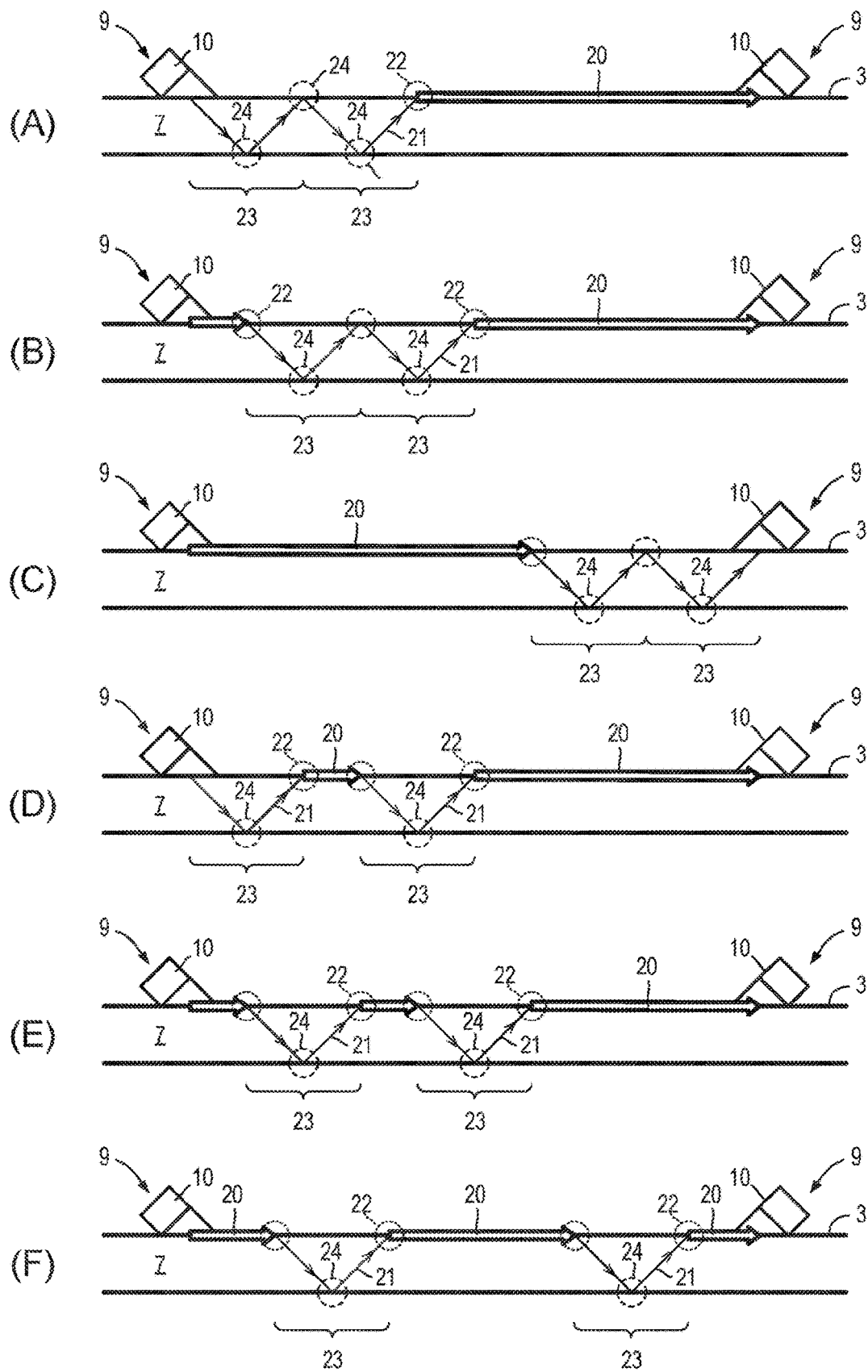
FIGS. 7A to 7F are schematic views of the pipe and clamp-on ultrasonic transducers shown in FIG. 1 illustrating ultrasonic wave propagation between the ultrasonic transducers via paths involving two or three reflections and propagation in the pipe as guided waves and which produce the same received wave packet.

Referring to FIG. 5, a wave can enter into the fluid 7, propagate as fluid wave 21 through the fluid 7 and when it reaches the opposite side of the pipe 3 be mode-converted 22 into a guide wave 20 and travel along the pipe wall 3. As it travels along the pipe wall 3, the guided wave 20 can mode-convert 22 back into a fluid wave in the pipe and, when this occurs the appropriate position, the wave may be received by the detector transducer to.

Referring to FIGS. 6A to 6D, a wave can travel via any one of a number of paths which includes one 'V' shaped path section 23 in the fluid 7 involving one reflection 24. Each of the paths shown in FIGS. 6A to 6D arrive at the receive transducer to at the same time and, thus, result in the same wave packet.

Referring to FIGS. 7A to 7F, a wave can travel via any one of a number of paths which includes two 'V' shaped path sections 2 in the fluid 7, involving two or three reflections 24. Each of the paths shown in FIGS. 7A to 7F arrive at the receive transducer to at the same time and, thus, result in the same wave packet.

Figure 8A:
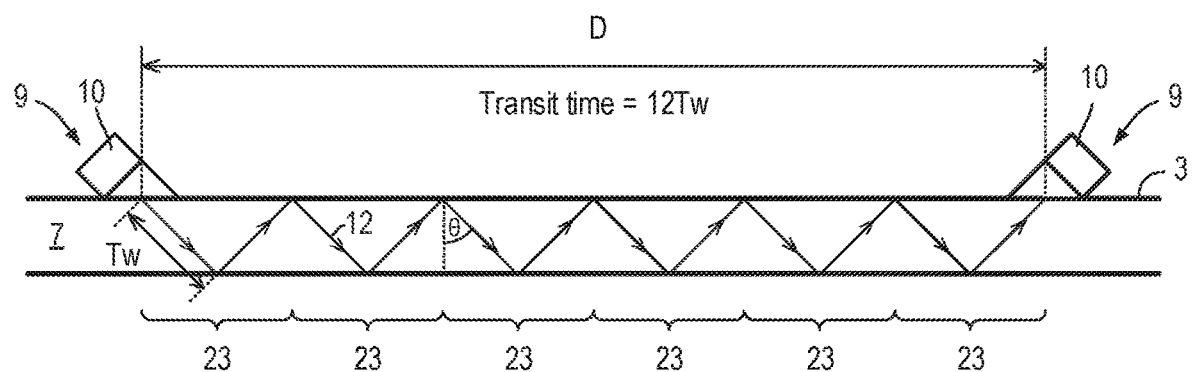
FIGS. 8A and 8B schematically illustrates notional units of transit time in a fluid and in a pipe wall, respectively.
Figure 8B:
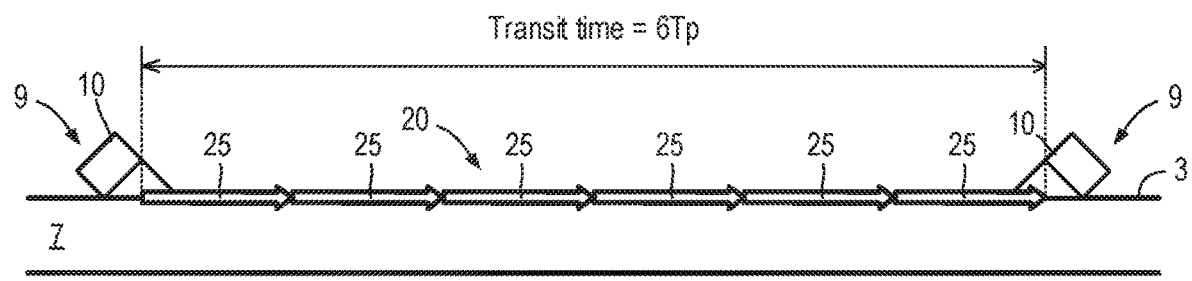

Referring to FIGS. 8A and 8B, transit times between the transducer units 9 for a guided and fluid waves 12 are shown. The figures are based on the fact that distance is proportional to time and so the same length can be treated as the same duration of time.

Referring to FIG. 8A, for a given path angle θ the transducer units 9 are separated by a distance D so that there the transducer units 9 are located at respective points of maximum amplitude. Thus, there is an integer number N of path lengths between opposite sides of the pipe 3 through the fluid 7 and N/2 'V'-shaped path sections 23. In this case, there are 12 path lengths, 6 'V'-shaped path sections 23 and 11 reflections off the inside of the pipe (R=11). The propagation time for ultrasonic waves 12 in each path length is $T_w$. Thus, the total propagation time is 12 $T_w$ between the transducer units 9.

Referring to FIG. 8B, the path for guided waves is divided into N/2 lengths. Thus, in this case, there are six guided wave path lengths 25. The propagation time for guided waves in each path length is $T_P$. Thus, the total propagation time is 6 $T_P$ between the transducer units 9.

It is noted that guided waves propagate along the pipe wall 3 more quickly than the waves through the fluid.

Figure 9:
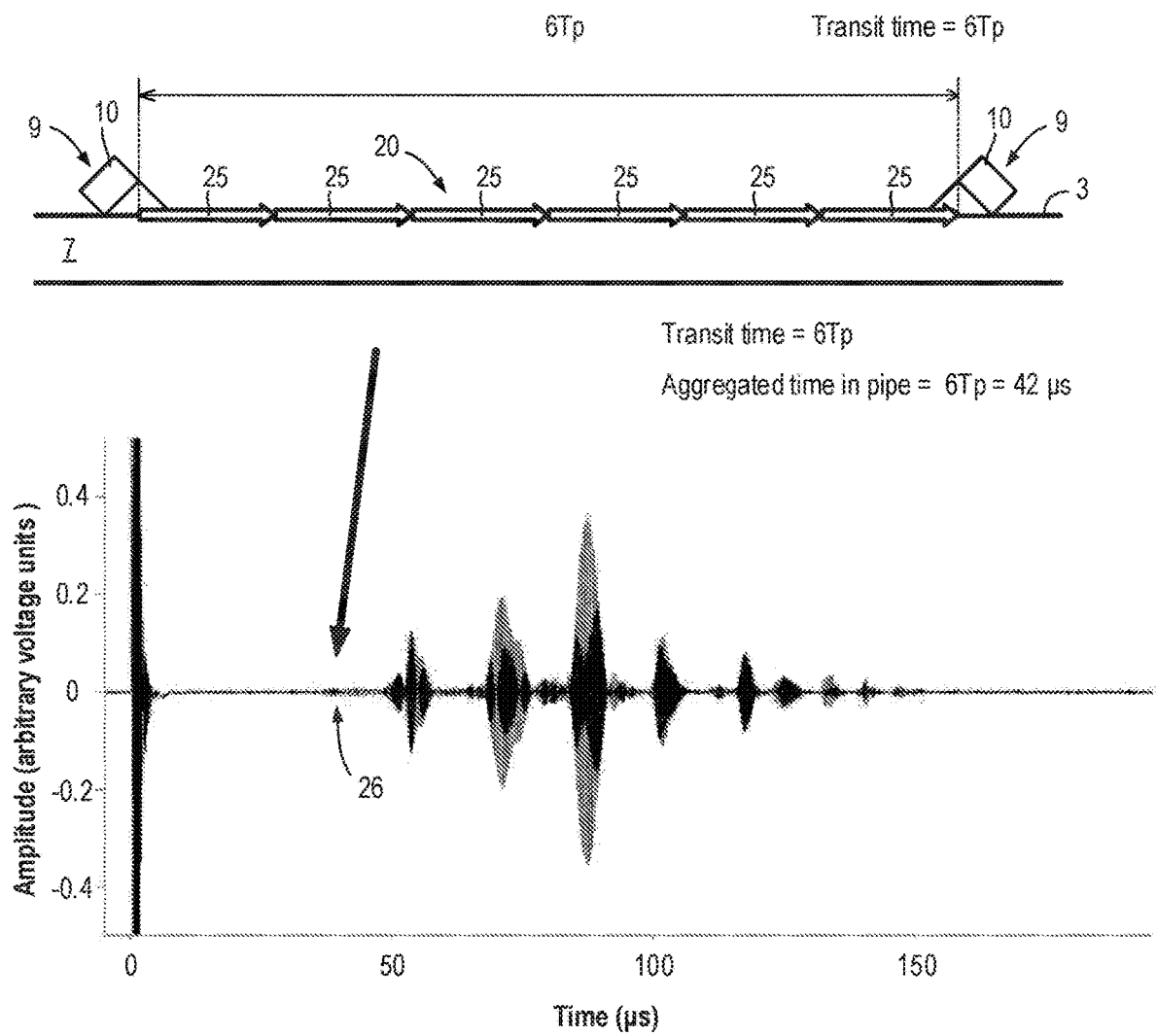
FIG. 9 schematically illustrates which wave packets in a plot of signal amplitude against time correspond to ultrasonic wave propagation between ultrasonic transducers via paths propagating solely through the wall of the pipe.

Referring now to FIG. 9, the wave packet 26 corresponding to paths solely consisting of a guided wave 20 propagating through the pipe wall 3 is received about 42 microseconds after excitation. Thus, if this corresponds to six guided wave path lengths 25, then a single guided wave path length propagation time $T_P$ is about 7 microseconds.

Figure 10:
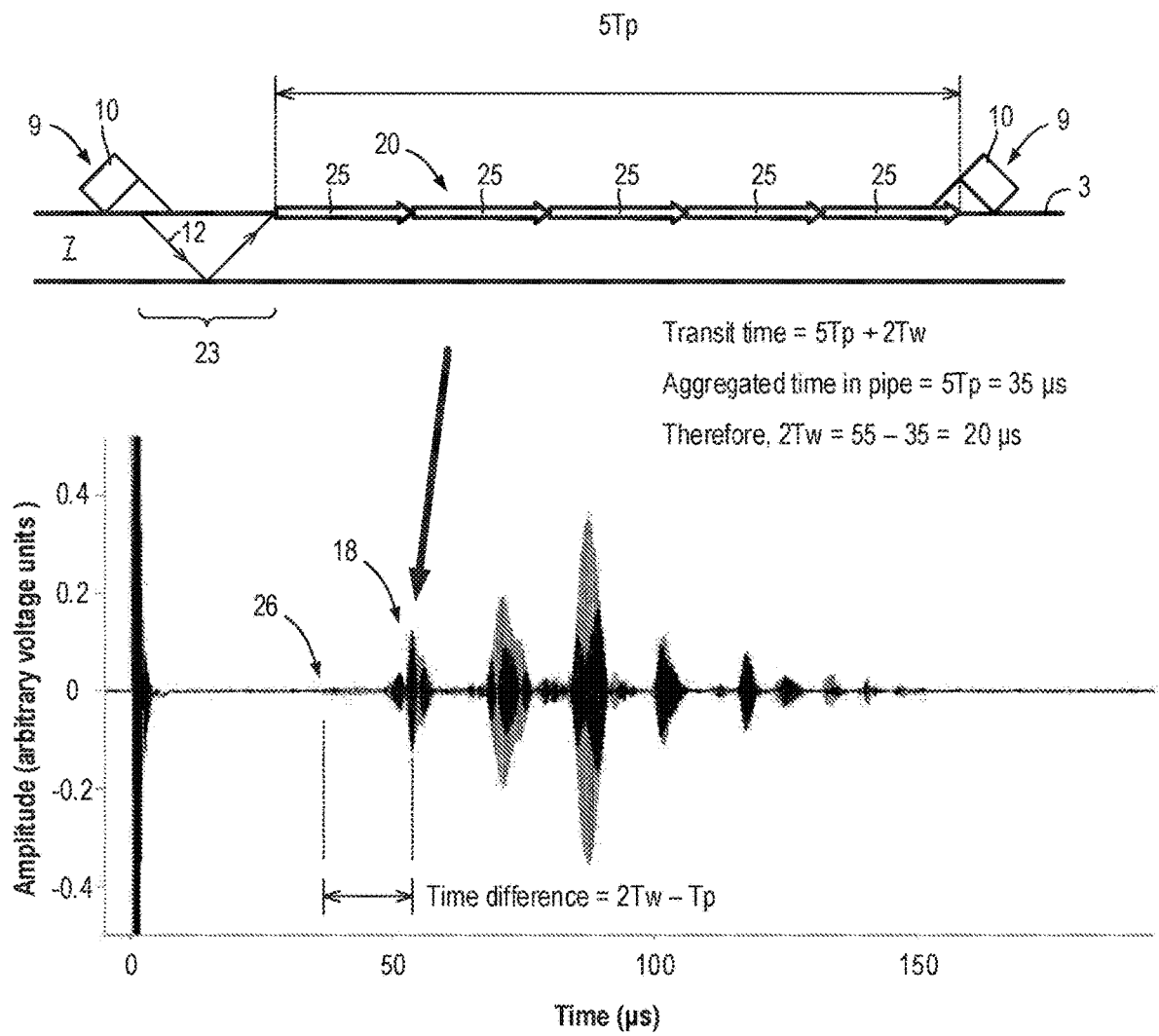
FIG. 10 schematically illustrates which wave packets in a plot of signal amplitude against time correspond to ultrasonic wave propagation between ultrasonic transducers via paths involving one V'-shaped fluid propagation path section.

Referring now to FIG. 10, the wave packet 18 corresponding to paths consisting of a fluid wave 12 propagating through one V-shaped path section 23 and the rest of the path as a guided wave 20 propagating through the pipe wall 3 is received about 55 microseconds after excitation. Thus, if this corresponds to one 'V'-shaped path section 23 and five guided wave path lengths 25, then the wave propagates through the fluid for 20 microseconds and through the pipe for about 35 microseconds. Thus, a single fluid wave path length propagation time $T_w$ is about to microseconds.

Figure 11:
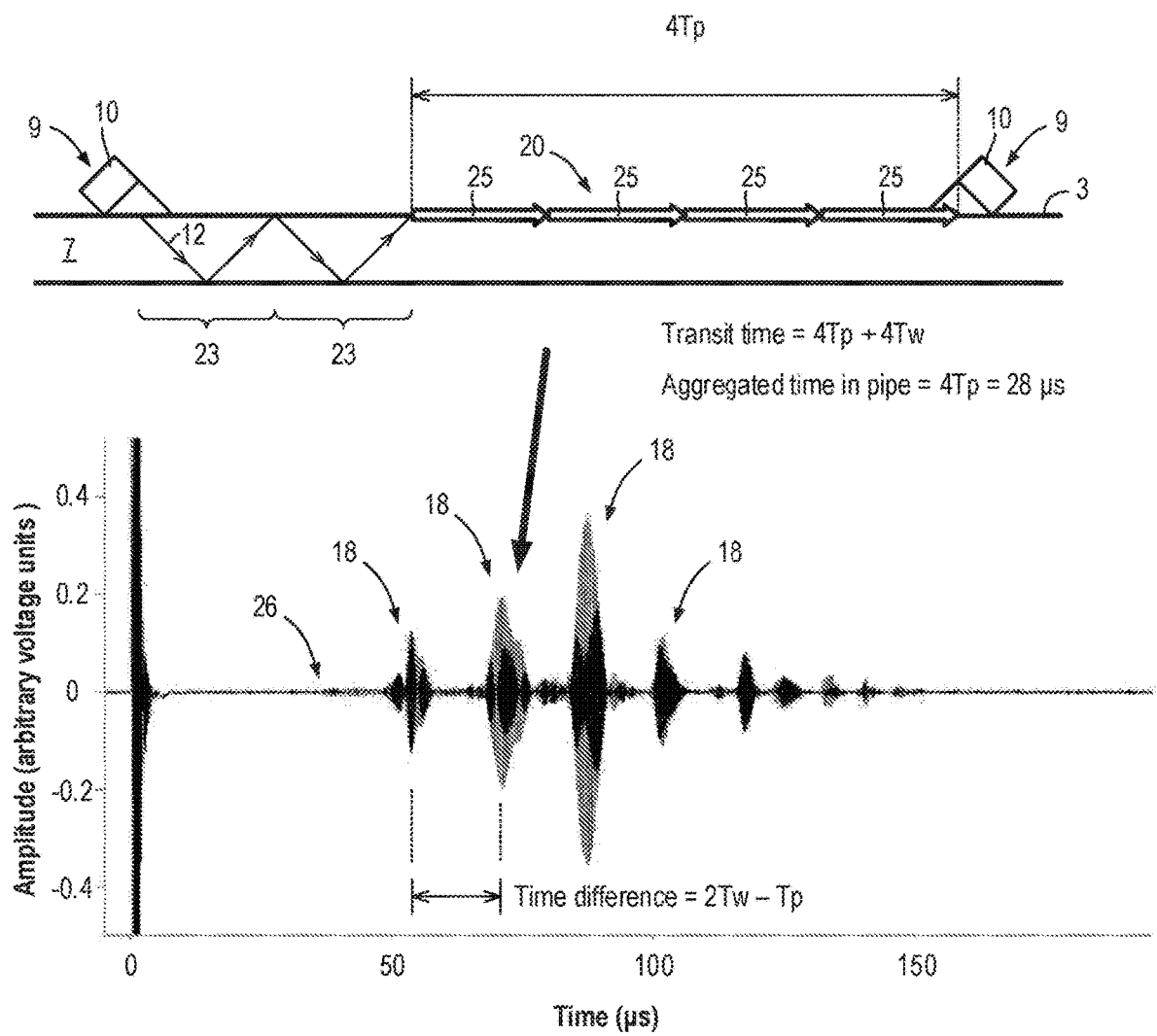
FIG. 11 schematically illustrates which wave packets in a plot of signal amplitude against time correspond to ultrasonic wave propagation between ultrasonic transducers via paths involving two V'-shaped fluid propagation path sections.

Referring now to FIG. 11, the wave packet 18 corresponding to paths consisting of a fluid wave 12 propagating through two 'V' path sections 23 and the rest of the path as guided waves 20 propagating through the pipe wall 3 is received about 68 microseconds after excitation. Thus, if this corresponds to two 'V'-shaped path section 23 and four guided wave path lengths 25, then the wave propagates through the fluid for 40 microseconds and through the pipe for about 28 microseconds.

Figure 12:
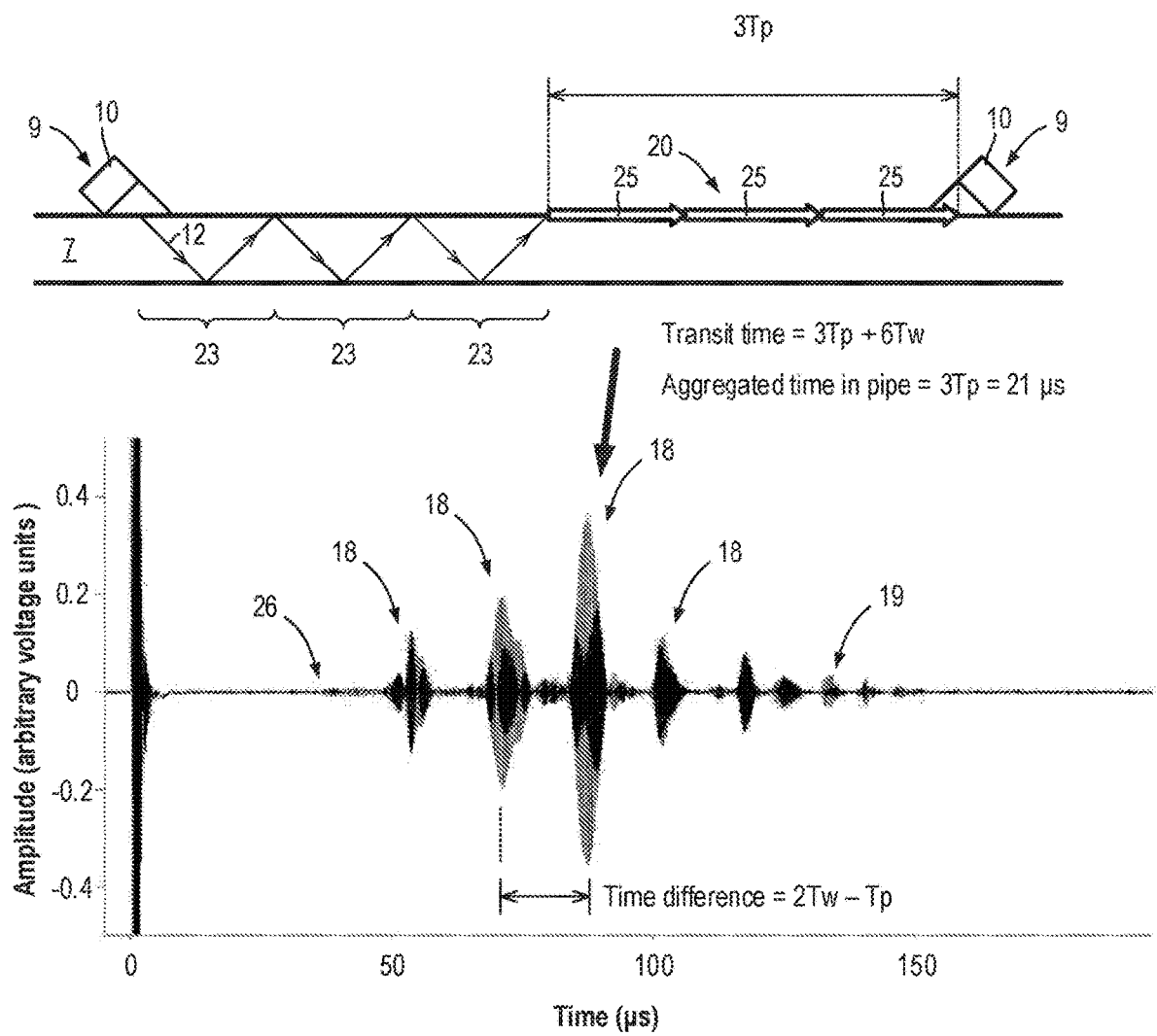
FIG. 12 schematically illustrates which wave packets in a plot of signal amplitude against time correspond to ultrasonic wave propagation between ultrasonic transducers via paths involving three V-shaped fluid propagation path sections.

Referring now to FIG. 12, the wave packet 18 corresponding to paths consisting of a fluid wave 12 propagating through three 'V' path sections 23 and the rest of the path as guided waves 20 propagating through the pipe wall 3 is received about 83 microseconds after excitation. Thus, if this corresponds to three V-shaped path section 23 and three guided wave path lengths 25, then the wave propagates through the fluid for 60 microseconds and through the pipe for about 21 microseconds.

Figure 13:
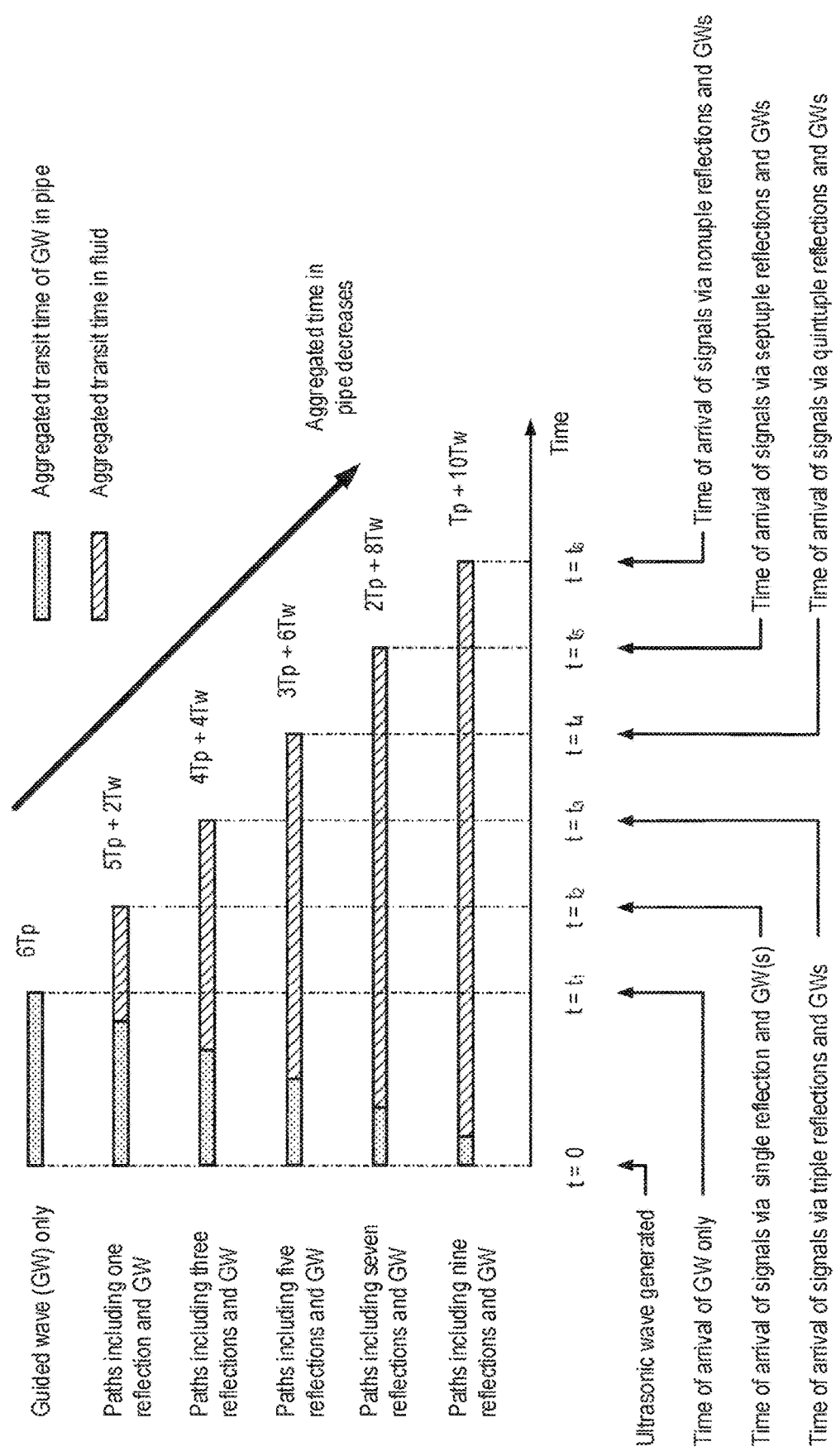
FIG. 13 is a timing diagram schematically illustrating relative propagation times between ultrasonic transducers via paths involving no reflections, single reflections, triple reflections, quintuple reflections, septuple reflections and nonuple reflections.

Referring again to FIGS. 9 to 12 and also to FIG. 13, times of arrival of wave packets depends, therefore, on the path taken by waves. The earliest time of arrival correspond to the waves propagating solely through the pipe 3.

Referring in particular to FIG. 12, it is clear that the wave packet 19 corresponding to propagation solely through the fluid 7 (but through the pipe wall on its outbound and inbound journey to reach the fluid) has a comparatively small amplitude even through the arrangement 1 (in terms of placement and separation of the transducer units 9) is optimized. It is clear that any of the preceding wave packets 18 involving at least one V' path section 23 in the fluid would serve as a better wave packet for an ultrasonic flow measurement. The wave packet 18 corresponding to three 'V'-shaped path section 23, however, has the highest amplitude.

Figure 14:
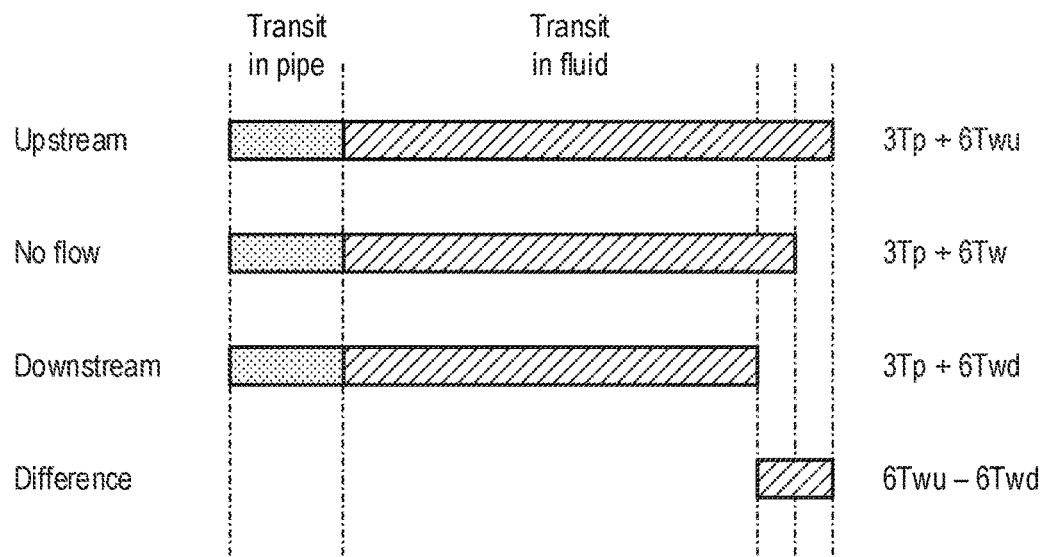
FIG. 14 is a timing diagram schematically illustrating upstream and downstream times-of-flight and calculation of flowrate.

Referring also to FIG. 14, it can be seen that, provided the number of 'V'-shaped path sections 23 is known, a flow rate can be found by taking the difference of upstream and downstream times of flight. The contributions due to transmission through the pipe cancel each other, leaving only the velocity contribution through the fluid 7.

Figure 15:
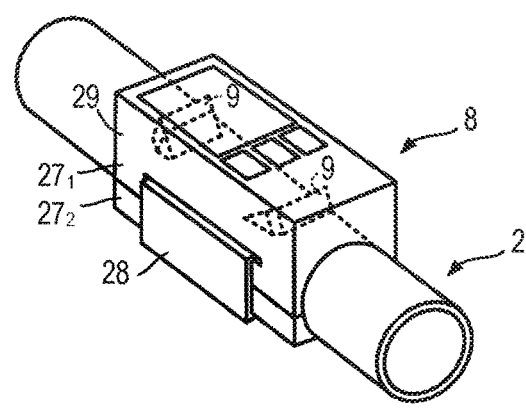
FIG. 15 is a perspective view of a clamp-on flowmeter.

Referring to FIG. 15, the clamp-on ultrasonic flowmeter 8 can take the form of a hinged or two-piece device having first and second wings or parts $27_1$, $27_2$ which fit either side of a section of pipe 2 and secured together using a clip 28.

The flowmeter 8 can house both transducers 10 in the one housing 29. The transducers 10, however, can be mounted separately. For example, the transducer units 9 (FIG. 1) may be separately attached to the pipe 3 using band or clips, or even adhesive.

Figure 16:
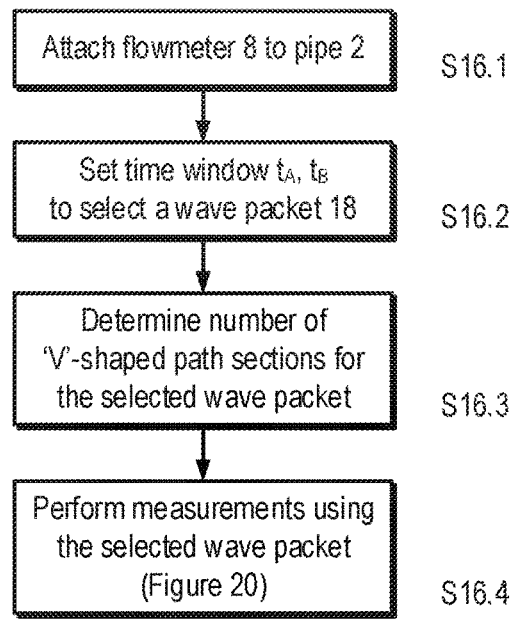
FIG. 16 is process flow diagram of a method of installing a clamp-on flowmeter.

Referring also to FIG. 16, the spacing D of the transducer units 9 does not need to be adjusted to have a specific value.

Figure 17:
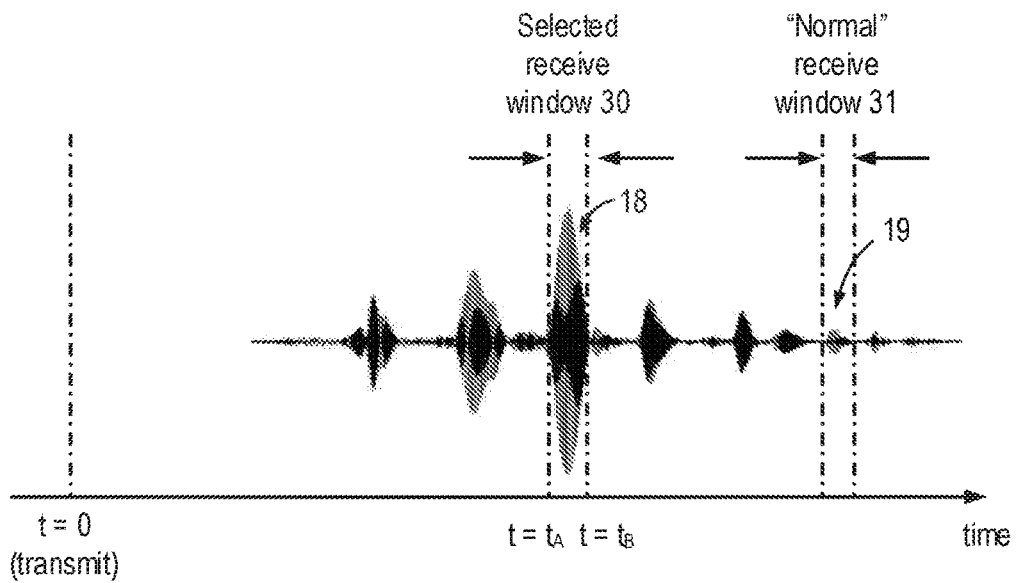
FIG. 17 illustrates a receive time window selecting a wave packet.

Referring to FIG. 17, in one approach, one of the wave packets 18 (FIG. 2) is selected for time-of-flight measurements. For example, the flowmeter 8 (in which the spacing of the transducer units 9 may or may not be fixed) is simply attached to the pipe (step S16.1). A measurement window 30 is then selected (steps S16.2) and the number of 'V'-shaped path sections is determined (step S16.3). The window and/or number can be manually entered by the user. The window and/or number can be automatically determined by the flowmeter 8, for example, based on a pipe diameter input by the user or sensed by the flowmeter since peaks can be expected within certain ranges for a given pipe diameter. The flowmeter 8 then performs the measurement using the peak (step S16.4).

In another approach, several wave packets 18 (FIG. 2) are used. In this case, the number of 'V'-shaped path sections corresponding to each wave packet 18 (FIG. 2) is identified and used in the measurement.

Although the spacing D of the transducer units 9 does not need to be adjusted to have a specific value, they can still nevertheless be adjusted to improve signal-to-noise ratio. The spacing D, however, does not need to be accurate or take a specific value per se.

Figure 18:
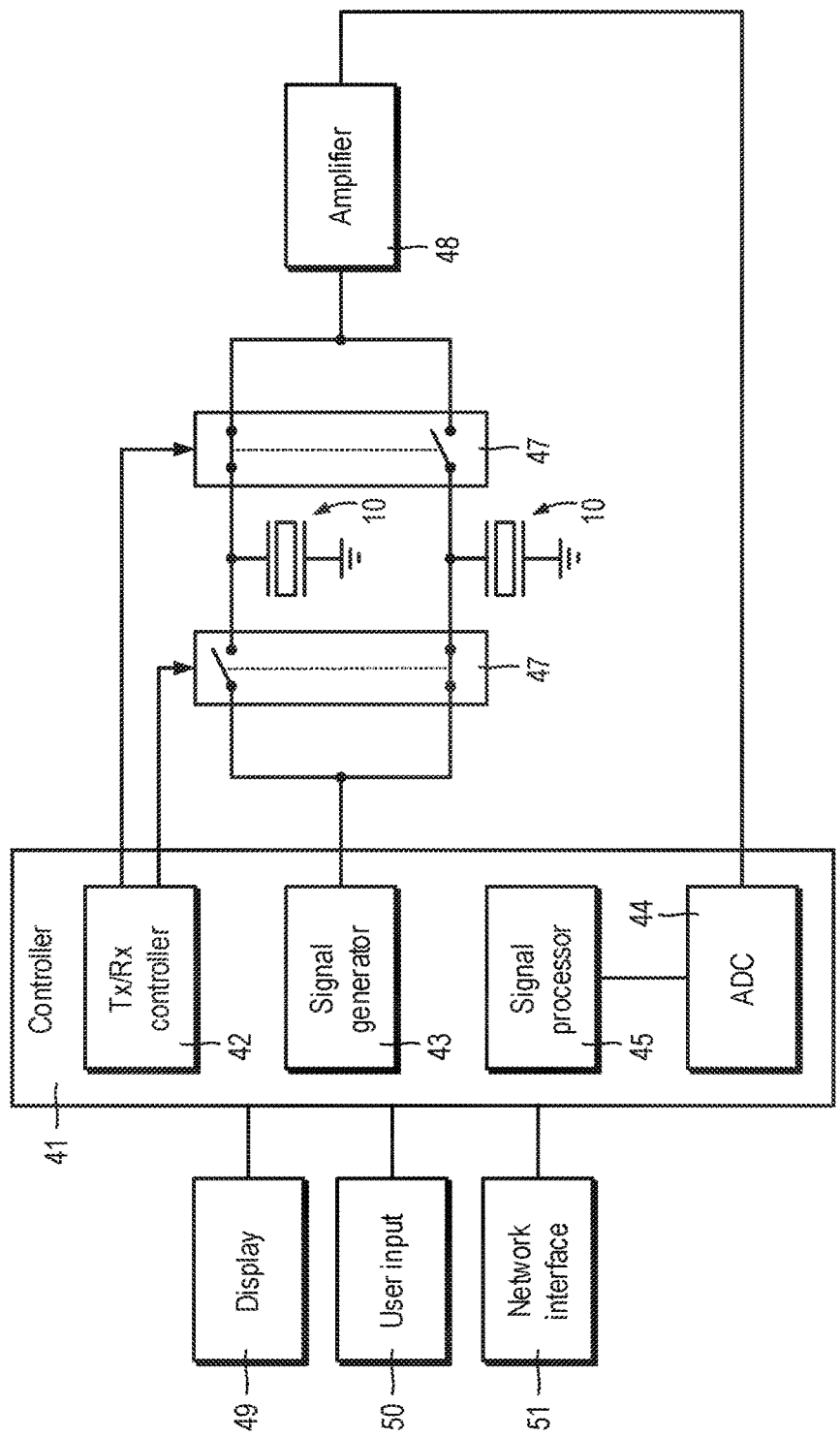
FIG. 18 is a schematic block diagram of an ultrasonic flow measurement system including a signal processor.

Referring to FIG. 18, the flowmeter 8 comprises a controller 41, for example in the form of a microcontroller, which includes a transmit/receiver control block 42, a signal generator 43 which may generate, for example, a square wave, an ADC 44 and a signal processor block 45.

The flowmeter 8 includes a front end 46 comprising a set of switches 47 for switching transducers to between transmit and receive mode and, thus, providing upstream and downstream measurements. The flowmeter 8 also includes an amplifier 48 for amplifying a received signal from the transducer to operating in receive mode.

The flowmeter 8 may include a display 49, for example in the form of LCD display, user input device 50, for example in the form of button switches, and/or a network interface 51, for example, for allowing the flow measurement results sent to users through the network. The flow meter 8 may additionally or alternatively be provided with wired connectivity (such as a USB interface) or wireless connectivity (such as Bluetooth (RTM) or WLAN) to allow the flow meter 8 to connect via a wired link or wireless link to local or remote devices (no shown).

Figure 19:
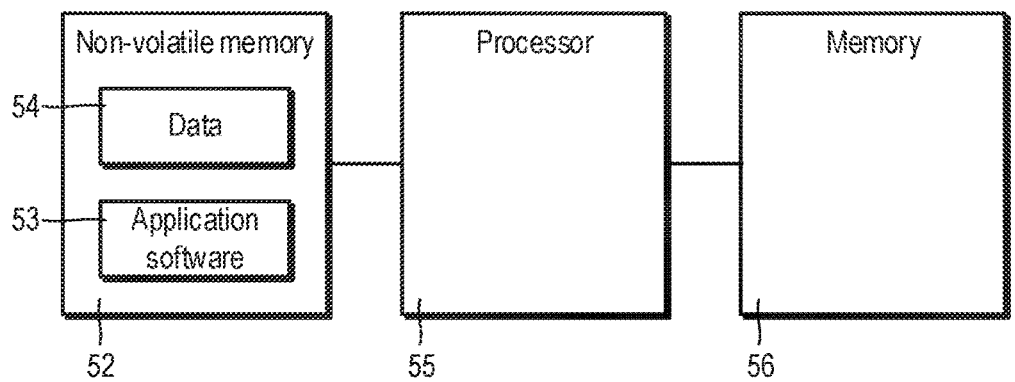
FIG. 19 is a schematic block diagram of processor-based signal processor.

Referring also to FIG. 19, the controller 41 includes non-volatile memory 52 which stores flow metrology application software 53 and suitable data 54, such as parameters and/or look-up table(s) for calculating flowrate, a processor 45 and volatile memory 56 used as working memory. The transmit/receiver control block 42 and the signal processing block 45 may be implemented in software run on the processor 55.

Figure 20:
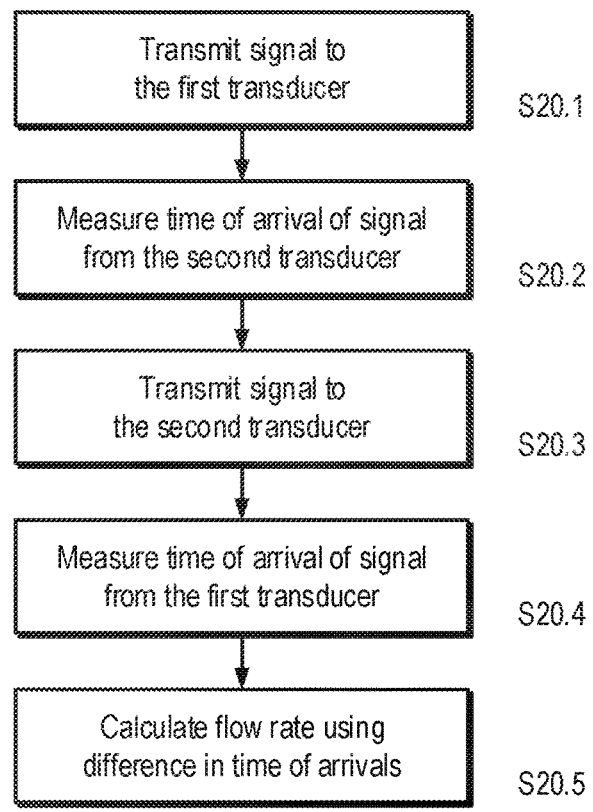
FIG. 20 is a process flow diagram of a method of computing a flowrate of a fluid in a pipe.

Referring to FIG. 20, the controller 41 determines flowrate by performing upstream and downstream time-of-flight measurements using a selected wave packet (i.e., peak). The controller 31 may determine timing of a peak in different ways, for example, by differentiation and looking for zero crossing.

In a first measurement in a first direction, the controller 41 triggers a transmit pulse (for example, in the form of a tone burst pulse) to be transmitted by the first transducer to (step S20.1) and measures the elapsed time until it receives a signal from the second transducer to (step S20.2).

In a second measurement in a second, opposite direction, the controller 41 triggers a transmit pulse to be transmitted by the second transducer to (step S20.3) and measures the elapsed time until it receives a signal from the first transducer 10 (step S20.4).

The controller 41 then calculates the flowrate by calculating a difference between the elapsed times and calculating a flowrate using the difference (step S20.5). The controller 41 can calculate the flowrate using a look-up table stored in memory 52.

The process may by repeated, e.g., once every second. The controller 41 may measure several values of flowrate and take an average.

The controller 41 can display the calculated flowrate or averaged on the display 49, record it in memory 52 and/or transmit it remotely via the network interface 51.

Alternative Transducer Arrangement

In the examples hereinbefore described, the transducer units 9 (FIG. 1) are mounted on the same side of the pipe 2 (FIG. 1), at the same circumferential angle, such as both at 0° (measured from the top of the pipe). Typically, when transducer units 9 (FIG. 1) are mounted on the same side of the pipe 2 (FIG. 1), then there is an odd number of reflections R.

The transducer units may, however, be mounted at different circumferential angles separated, for example, by 180° (such as one transducer unit located at 0° and the other transducer unit located at 180°), by 90° or by some other, different angle.

Figure 21:
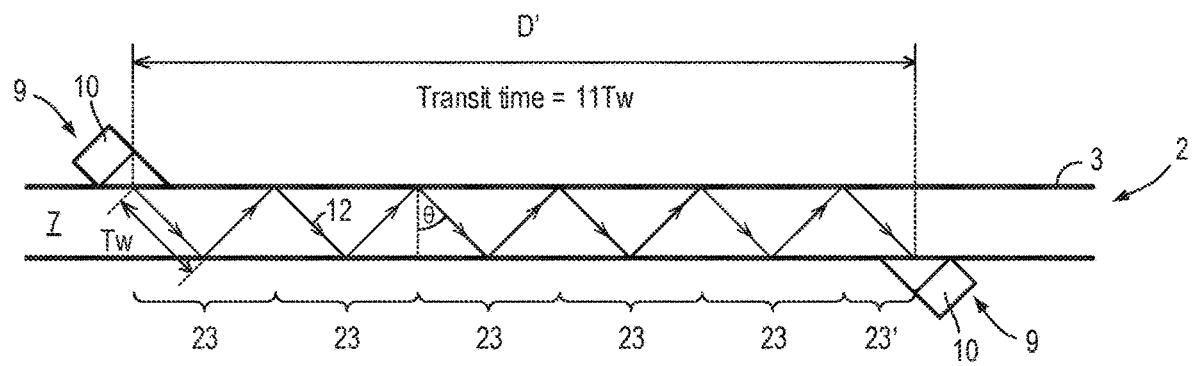
FIG. 21 is a schematic view of a pipe and two clamp-on ultrasonic transducers attached to the pipe at different positions along the pipe on opposite sides of the pipe and a path comprising multiple V-path sections between the ultrasonic transducers.

Referring to FIG. 21, the transducer units 9 are located on opposite sides of the pipe 2 (i.e., separated by circumferentially by 180°). In such a configuration, there are a half-integer number of 'V'-shaped paths 23, 23' and there are ten reflections (R=10). Typically, when transducer units 9 (FIG. 1) are mounted on opposite sides of the pipe 2, then there is an even number of reflections R.

Figure 22:
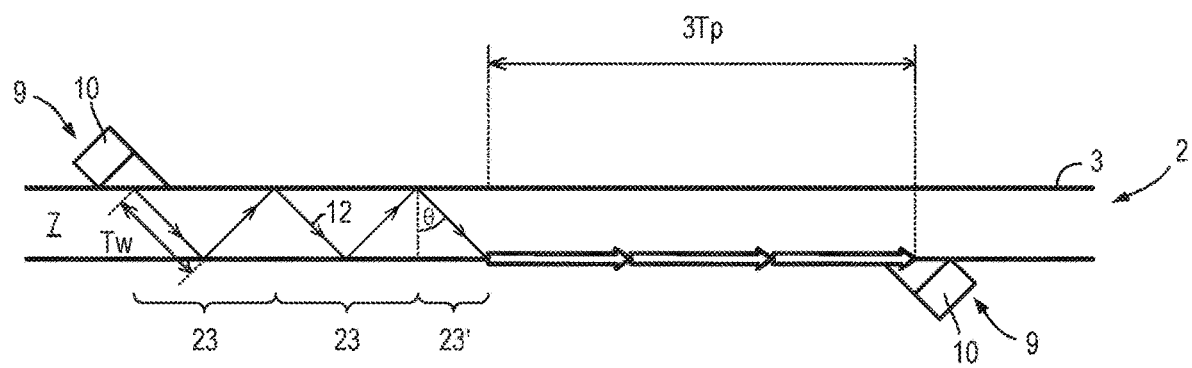
FIG. 22 schematically illustrates ultrasonic wave propagation between the ultrasonic transducers which are attached on opposite sides of the pipe via a path involving two-and-a-half V-shaped fluid propagation path sections.

Referring also to FIG. 22, the method hereinbefore described can be used for transducer units 9 are located on opposite sides of the pipe 2. Thus, instead of accurately positioning the transducer units 9 so that they are precisely separated by a half-integer number of V'-shaped paths 23, 23' or use the wave packet corresponding to a half-integer number of V-shaped paths 23, 23', a smaller number of half-integer number of 'V'-shaped paths 23, 23' can be used.

The method hereinbefore described can be used for transducer units 9 are mounted at different circumferential angles that differ by angles other than 0° and 180°.

Complex Nature of Paths

Hereinbefore, a simple description of wave propagation is used and single-ray trace diagrams are employed. Propagation in thin-walled pipes is, however, more complex. When ultrasonic waves travel along a fluid-filled pipe, they do so simultaneously through the fluid and the pipe wall as guided waves. The characteristics of waves arriving at a detection transducer depend on the elastic properties and density of the pipe and of the liquid inside the pipe and on the geometry of the pipe. For a pipe having a wall thickness that is similar in size to or smaller than a wavelength of ultrasonic wave being used, wave propagation cannot be accurately described by simple ray tracing. Instead, the pipe and fluid should be considered as a single, combined system through which ultrasonic waves propagate.

Guided waves that propagate through the fluid-pipe system can be detected at any angular position around the circumference of the pipe and at longitudinal position along the pipe. Thus, rather than considering particular wave arrivals existing only at certain spatial positions along the pipe, a wider range of wave arrivals can be used.

Therefore, by taking advantage of the effect of guided waves through the fluid-pipe system can help to relax the need to position the transducers precisely.

Modifications

It will be appreciated that various modifications may be made to the embodiments hereinbefore described. Such modifications may involve equivalent and other features which are already known in the design, manufacture and use of transit flow measurement systems and component parts thereof and which may be used instead of or in addition to features already described herein. Features of one embodiment may be replaced or supplemented by features of another embodiment.

Although the methods of determining flowrate hereinbefore described are based on time-of-flight, phase different methods can also be used. For example, a phase difference measurement between almost time coincident pulses, whose arrival times differ only due to the transit time difference caused by liquid flowing through the pipe, can be used.

In some approaches, both transducers can be excited simultaneously, thereby helping to ensure high precision and reproducibility. After the excitation pulse is applied to both transducers, a relay or other form of electronic switch is used to isolate the transducers from each other. Each transducer sends its received signal via an amplifier, filter and/or other front-end signal conditioning circuitry and the received signals are analysed to determine a time difference. For example, this can be achieved using an ADC and signal processing of the captured digital signal to measure the phase difference.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of determining flowrate of a fluid in a pipe having a pipe wall using a flowmeter having first and second ultrasonic transducers separated by a given distance along the pipe and inclined so that waves in the fluid propagate at a given path angle, wherein, for a given pipe diameter, there is a given integer number of reflections between the first and second ultrasonic transducers, the method comprising:
obtaining a flow rate using a wave packet corresponding to an integer number of reflections which is less than said given number for an ultrasonic wave which has propagated as a guided wave in the pipe wall, setting a time window so as to select the wave packets corresponding to the integer number of reflections and selecting the wave packets corresponding to the integer number which exceeds a given threshold value of signal-to-noise or which has a largest value of signal-to-noise.

2. The method of claim 1, wherein obtaining the flow rate comprises:
taking time-of-flight measurements between the first and second ultrasonic transducers.

3. The method of claim 1, wherein obtaining the flow rate comprises:
taking a phase difference measurement between first and second pulses transmitted simultaneously by the first and second ultrasonic transducers, respectively and received by the second and first ultrasonic transducers, respectively.

4. The method of claim 1, comprising:
obtaining a flow rate using at least two, different wave packets in a same received signal corresponding to respective integer numbers of reflections.

5. The method of claim 1, comprising:
exciting the first and second ultrasonic transducers simultaneously;
isolating the first and second transducers from each other; and
sending first and second signals received by the first and second transducers, respectively, to a circuit for measuring a difference in first and second transit times for the first and second signals, respectively.

6. The method of claim 1, comprising:
adjusting separation of the first and second ultrasonic transducers.

7. The method of claim 1, comprising:
prompting a user to adjust separation of the first and second ultrasonic transducers.

8. A computer program comprising instruction which, when executed by a data processor, causes the data processor to perform the method of claim 1.

9. A computer program product comprising a computer-readable medium storing therein the computer program of claim 8.

10. The method of claim 1, wherein the pipe diameter is selected from the group consisting of 15 mm, 22 mm, 28 mm, 35 mm, 42 mm, 54 mm, 66.7 mm, 76.1 mm, and 108 mm.

11. The method of claim 1, wherein the pipe has a Copper Tubing Size (CTS) nominal size selected from the group consisting of ¼, ⅜, ½, ⅝, ¾ 1, 1¼, 1½, 2, 2½ and 3, and wherein the pipe as a copper tubing type selected from the group consisting of Type K, Type L, and Type M.

12. The method of claim 1, wherein the given integer number of reflections is between 1.5 and 11.

13. The method of claim 12, wherein the given integer number of reflections is between 3 and 8.

14. A signal processor configured to determine flowrate of a fluid in a pipe having a pipe wall using first and second ultrasonic transducers separated by a given distance along the pipe and inclined so that waves in the fluid propagate at a given path angle, wherein, for a given pipe diameter, there is a given integer number of reflections between the first and second ultrasonic transducers, the signal processor configured to obtain a flow rate by selecting wave packets corresponding to an integer number of reflections which is less than said given number for an ultrasonic wave which has propagated as a guided wave in the pipe wall.

15. An ultrasonic flowmeter comprising:
first and second ultrasonic transducers; and
instrumentation configured to determine flowrate of a fluid in a pipe having a pipe wall using the first and second ultrasonic transducers to be separated by a given distance along the pipe and inclined so that waves in the fluid propagate at a given path angle, wherein, for a given pipe diameter, there is a given integer number of reflections between the first and second ultrasonic transducers, the instrumentation configured to obtain a flow rate by selecting wave packets corresponding to an integer number of reflections which is less than said given number for an ultrasonic wave which has propagated as a guided wave in the pipe wall.

16. A system comprising:
a pipe; and
the ultrasonic flowmeter of claim 15, wherein the first and second ultrasonic transducers are mounted to the pipe separated by a given distance along the pipe and inclined so that waves in the fluid propagate at a given path angle.

\* \* \* \* \*